Aug. 25, 1953     T. E. GRACE     2,650,104
LATERALLY EXTENSIBLE SUPPORTS
FOR TRACTION ELEMENTS

Filed Dec. 23, 1949     2 Sheets-Sheet 2

INVENTOR.
THEODORE E. GRACE
BY
*Thos. S. Donnelly*
ATTORNEY

Patented Aug. 25, 1953

2,650,104

UNITED STATES PATENT OFFICE 2,650,104

LATERALLY EXTENSIBLE SUPPORTS FOR TRACTION ELEMENTS

Theodore E. Grace, Detroit, Mich.

Application December 23, 1949, Serial No. 134,814

2 Claims. (Cl. 280—34)

My invention relates to a new and useful improvement in a support for tractor traction wheels and has for its object the provision of a support whereby the wheels of a tractor may be supported in such a manner that they may be easily and quickly moved inwardly and outwardly of each other.

Another object of the invention is the provision of a structure in a tractor whereby the tractor construction may be manufactured in a durable form while at the same time being retained quite light.

Another object of the invention is the provision in a tractor construction of this type of a supporting plate having a portion projecting inwardly therefrom adapted to telescope with the supporting body and in such a manner that the plate may be moved inwardly and outwardly with ease.

Another object of the invention is the provision of a tractor construction of this class which will be simple and economical to manufacture, easily and quickly assembled, durable and highly efficient to use.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which.

Figure 1:
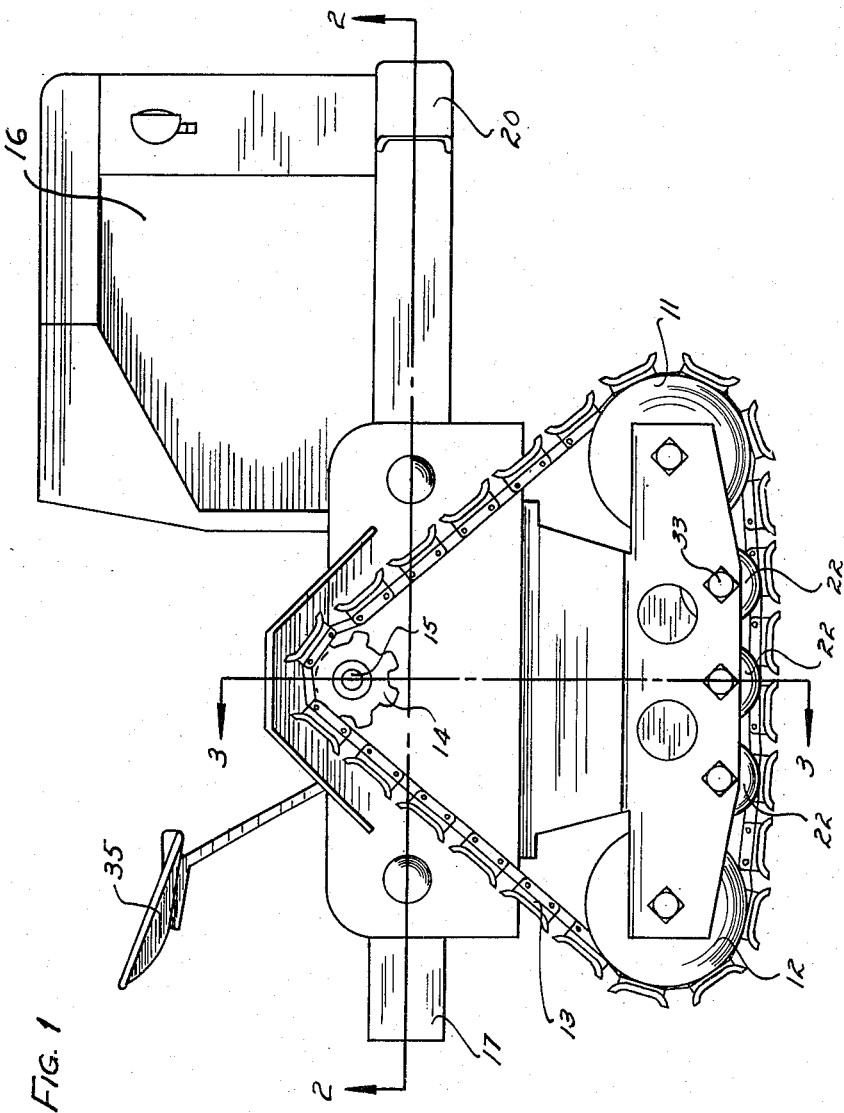
Fig. 1 is a side elevational view of the invention.
Figure 2:
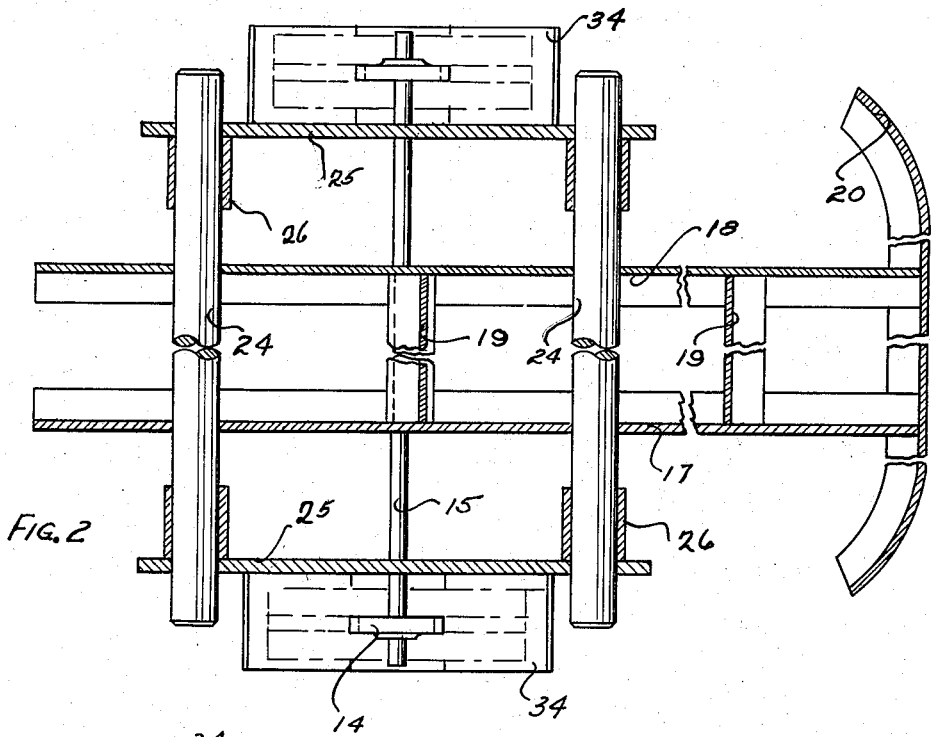
Fig. 2 is a sectional view taken on line 2—2 with parts removed and parts broken away.

In Fig. 1 I have shown the invention applied to a tractor in which I have utilized an endless track laying belt which passes around the traction wheels and lays a track in front of them. In the form shown in Fig. 1 I have indicated the larger traction wheels 11 and 12 mounted on suitable shafts 33A and I have likewise indicated the smaller traction wheels or rollers 22 mounted on a suitable shaft 33 and around these wheels passes an endless track laying belt 13 which also passes over the sprocket wheel 14 which is mounted on and rotated by the shaft 15. This shaft is suitably rotated by a transmission which is driven by the engine 16 but inasmuch as this mechanism forms no part of the present invention it is not shown in detail.

A chassis is provided embodying the side rails 17 and 18 connected together by the crossbars 19 and having at one end a bumper 20 which also serves to connect the rails 17 and 18.

Figure 3:
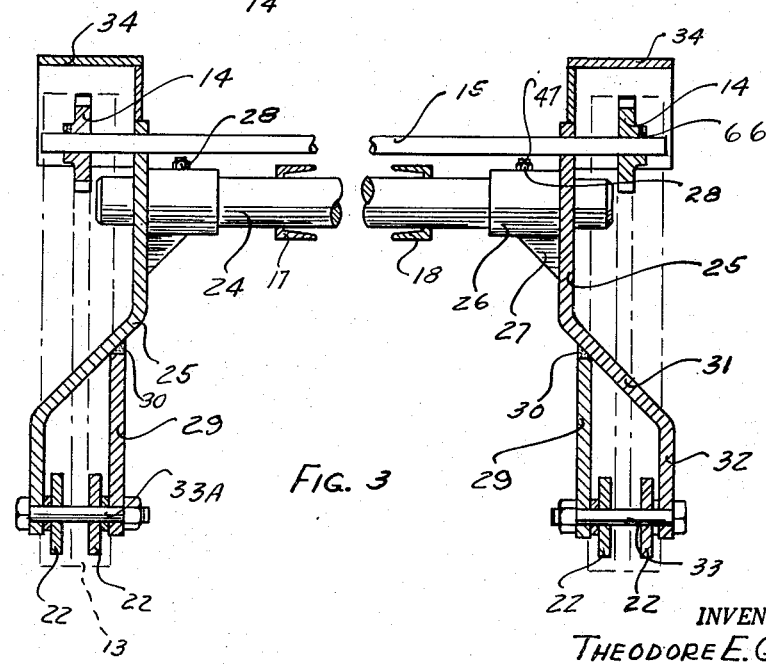
Fig. 3 is a sectional view taken on line 3—3 of Fig. 1 with parts broken away and parts removed.

Projecting through the side rails 17 and 18 and extending outwardly from opposite sides of the chassis and secured to the rails 17 and 18 are the supporting bars or rods 24. At each side of the structure there is provided a supporting plate 25 to which is welded by the weld 27 a tubular projection 26 projecting inwardly from plate 25. As clearly shown in Fig. 3 this plate 25 projects downwardly and is then provided with the angularly turned portion 31 terminating with the portion 32 which extends in a plane parallel to the plane of the portion 25. A set screw as shown in Fig. 7 is provided with a lock nut 28 whereby the tubular projection 26 may be secured in a fixed relation to the member 24 at various positions thereon. Secured by the weld 30 is a plate 29 which extends in spaced relation to and parallel to the portion 32 and between these plates are mounted the traction wheels 22 as well as the wheels 11. As shown in Fig. 3 a bolt 33 serves as a shaft or axle for the wheels 22 and a similar bolt 33A serves as an axle for the wheels 11. A shield 34 is mounted on the plate 25 so as to overhang a sprocket wheel 14, the belt 13 riding beneath the shield 34. The sprocket wheel 14 is secured by the set screw 66 on the shaft 15 in any desired position.

It is believed obvious that with this mounting by loosening the lock nut 28 of the set screw 47 on which this lock nut is mounted the plates 25 may be moved inwardly and outwardly of each other so as to accommodate the tractor through various widths of rows of crops being cultivated or otherwise being worked upon. The set screw 66 would of course also be loosened so that the entire structure embodying the plate 25 and the parts carried thereby as well as the belt and sprocket 14 could be moved inwardly or outwardly. In this manner it is a simple matter to adjust the width of the ground engaging portions of the tractor to accommodate the structure to rows of various widths. It will also be noted that by mounting the traction wheels in the manner indicated the plates 32 and 29 will serve as guards and prevent the accumulation of loose earth on the belt and around the traction wheels. It is also believed obvious that the structure is one which is possessed of a minimum number of parts so that the light structure thus becomes possible while at the same time one which may be economically manufactured.

What I claim is:

1. In a vehicle construction of the class described, comprising: a chassis having longitudinally extended rails; transversely extended supporting members mounted on said rails and projecting outwardly beyond opposite sides of said chassis; a plate positioned outwardly of opposite sides of said chassis and extending downwardly and thence angularly turned outwardly and thence extended downwardly in parallel relation to the upper portion of the plate; a second plate secured to said angularly turned portion adjacent the upper end thereof and extending in parallel relation to the upper portion of said plates; axles mounted on the lower portions of said plates; traction wheels mounted on said axles; a supporting member projecting inwardly from the inner side of each of said first mentioned plates adjacent the upper edge thereof in alignment with each of said transversely extended supporting members and engaging the same in telescopic relation and movable inwardly and outwardly thereof for moving said traction wheels inwardly and outwardly of said chassis.

2. In a vehicle construction of the class described, comprising: a chassis having longitudinally extended rails; transversely extended supporting members mounted on said rails and projecting outwardly beyond opposite sides of said chassis; a plate positioned outwardly of opposite sides of said chassis and extending downwardly and thence angularly turned outwardly and thence extended downwardly in parallel relation to the upper portion of the plate; a second plate secured to said angularly turned portion adjacent the upper end thereof and extending in parallel relation to the upper portion of said plate; axles mounted on the lower portions of said plates; traction wheels mounted on said axles; a supporting member projecting inwardly from the inner side of each of said first mentioned plates adjacent the upper edge thereof in alignment with each of said transversely extended supporting members and engaging the same in telescopic relation and movable inwardly and outwardly thereof for moving said traction wheels inwardly and outwardly of said chassis; and securing means for securing said plate in stationary relation to said chassis.

THEODORE E. GRACE.

References Cited in the file of this patent

UNITED STATES PATENTS

| Number | Name | Date |
|---|---|---|
| 2,057,211 | Shere | Oct. 13, 1936 |
| 2,223,650 | Weber | Dec. 3, 1940 |
| 2,362,068 | Hollmann et al. | Nov. 7, 1944 |
| 2,416,679 | Curtis | Mar. 4, 1947 |
| 2,467,947 | Skelton | Apr. 19, 1949 |

FOREIGN PATENTS

| Number | Country | Date |
|---|---|---|
| 484,471 | France | Oct. 9, 1917 |